(12) United States Patent
Kim et al.

(10) Patent No.: US 11,347,109 B2
(45) Date of Patent: May 31, 2022

(54) MULTILAYER LIQUID CRYSTAL FILM, POLARIZING PLATE AND METHOD FOR PREPARING POLARIZING PLATE

(71) Applicant: LG CHEM, LTD., Seoul (KR)

(72) Inventors: Ji Young Kim, Daejeon (KR); Youngjin Kim, Daejeon (KR); Kyun Do Park, Daejeon (KR); Dae Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/756,068

(22) PCT Filed: Jan. 21, 2019

(86) PCT No.: PCT/KR2019/000838
§ 371 (c)(1),
(2) Date: Apr. 14, 2020

(87) PCT Pub. No.: WO2019/146977
PCT Pub. Date: Aug. 1, 2019

(65) Prior Publication Data
US 2020/0319517 A1 Oct. 8, 2020

(30) Foreign Application Priority Data

Jan. 25, 2018 (KR) .................. 10-2018-0009403

(51) Int. Cl.
*G02F 1/1337* (2006.01)
*B32B 7/023* (2019.01)
(Continued)

(52) U.S. Cl.
CPC ........ *G02F 1/133711* (2013.01); *B32B 7/023* (2019.01); *B32B 7/06* (2013.01);
(Continued)

(58) Field of Classification Search
CPC .......... G02F 1/133711; G02F 1/13378; G02F 1/133757; G02F 1/133788;
(Continued)

(56) References Cited

U.S. PATENT DOCUMENTS

2007/0085951 A1* 4/2007 Hale .................. G02F 1/13363
349/117
2011/0043731 A1 2/2011 Shin et al.
(Continued)

FOREIGN PATENT DOCUMENTS

JP 2003-262727 A 9/2003
JP 2005-128315 A 5/2005
(Continued)

*Primary Examiner* — Ruiyun Zhang
(74) *Attorney, Agent, or Firm* — Dentons US LLP

(57) ABSTRACT

The present specification provides a multi-layer liquid crystal film including: a substrate; a first alignment film provided on the substrate; a first liquid crystal film provided on the first alignment film; a second alignment film provided on the first liquid crystal film and comprising a multifunctional acrylate; and a second liquid crystal film provided on the second alignment film, and a method for manufacturing a polarizing plate, including: laminating the multi-layer liquid crystal film to a polarizer, and peeling off the substrate.

16 Claims, 3 Drawing Sheets

(51) Int. Cl.
*B32B 7/06* (2019.01)
*B32B 27/16* (2006.01)
*B32B 27/30* (2006.01)
*G02F 1/1335* (2006.01)
*G02B 5/30* (2006.01)

(52) U.S. Cl.
CPC ............ *B32B 27/16* (2013.01); *B32B 27/308* (2013.01); *G02B 5/30* (2013.01); *G02F 1/133528* (2013.01); *B32B 2305/55* (2013.01); *B32B 2307/42* (2013.01); *B32B 2307/514* (2013.01); *C09K 2323/02* (2020.08); *C09K 2323/03* (2020.08); *G02F 1/133726* (2021.01); *G02F 2202/022* (2013.01)

(58) Field of Classification Search
CPC ......... G02F 1/133528; G02F 1/133633; G02F 2202/022; B32B 7/023; B32B 2305/55; B32B 2307/42; C09K 2323/00; C09K 2323/02; C09K 2323/03
USPC .... 428/1.1, 1.2, 1.3; 349/117, 118, 119, 123
See application file for complete search history.

(56) References Cited

U.S. PATENT DOCUMENTS

| | | | |
|---|---|---|---|
| 2012/0021742 A1* | 1/2012 | Lee | H04W 72/02 455/434 |
| 2012/0212692 A1 | 8/2012 | Ryu et al. | |
| 2014/0161993 A1 | 6/2014 | Yoo et al. | |
| 2015/0029445 A1 | 1/2015 | Takeda et al. | |
| 2015/0219812 A1 | 8/2015 | Kobayashi | |
| 2016/0047963 A1 | 2/2016 | Kagawa et al. | |
| 2016/0195655 A1 | 7/2016 | Kagawa et al. | |
| 2017/0075171 A1 | 3/2017 | Lee et al. | |
| 2018/0067348 A1 | 3/2018 | Hatanaka | |
| 2019/0056627 A1* | 2/2019 | Kim | B32B 7/00 |

FOREIGN PATENT DOCUMENTS

| | | | | |
|---|---|---|---|---|
| JP | 4467039 B2 | 3/2010 | | |
| JP | 2011-510345 A | 3/2011 | | |
| JP | 2014-071190 A | 4/2014 | | |
| JP | 2015-043073 A | 3/2015 | | |
| JP | 2015-163957 A | 9/2015 | | |
| JP | 2017-058659 A | 3/2017 | | |
| JP | 2017-090585 A | 5/2017 | | |
| JP | 2017-097331 A | 6/2017 | | |
| KR | 10-2012-0099183 A | 9/2012 | | |
| KR | 10-2013-0011195 A | 1/2013 | | |
| KR | 101328109 B1 * | 11/2013 | ........... | G02B 5/3016 |
| KR | 10-2015-0144590 A | 12/2015 | | |
| KR | 1020170033228 A | 3/2017 | | |
| KR | 10-2017-0084638 A | 7/2017 | | |
| KR | 10-2017-0127013 A | 11/2017 | | |
| KR | 10-2017-0142476 A | 12/2017 | | |
| WO | 2014-189040 A1 | 11/2014 | | |
| WO | 2015-046399 A1 | 4/2015 | | |
| WO | WO-2018043979 A1 * | 3/2018 | ............ | B32B 27/08 |

* cited by examiner

[Figure 1]
[Figure 2]
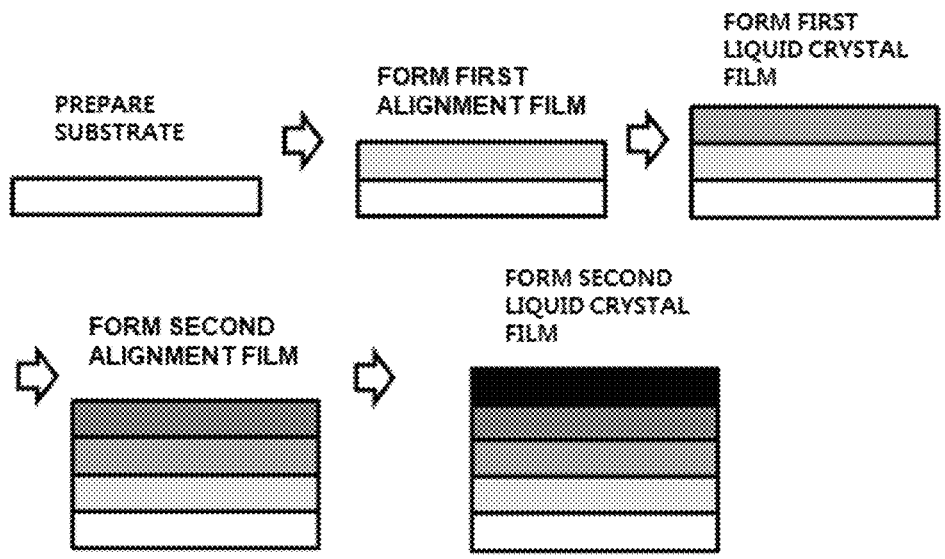

[Figure 3]
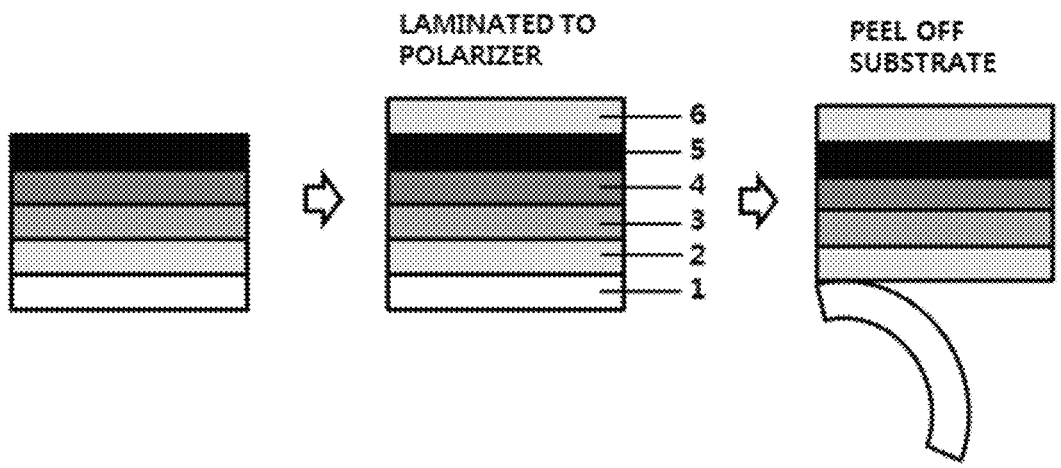
[Figure 4]
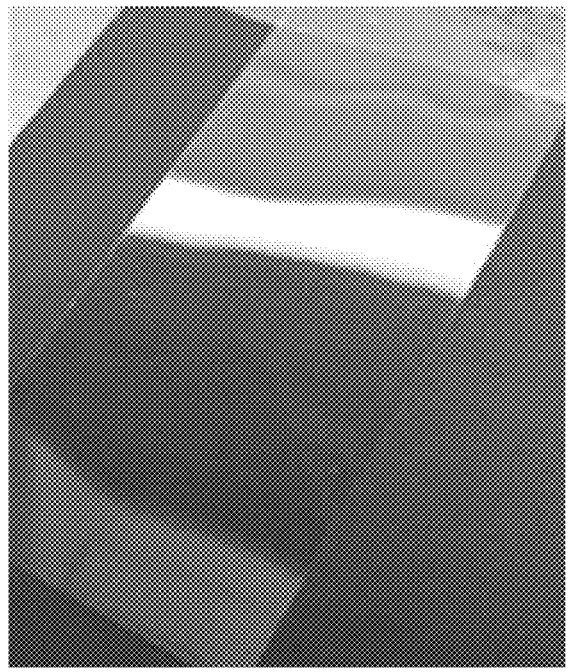

[Figure 5]
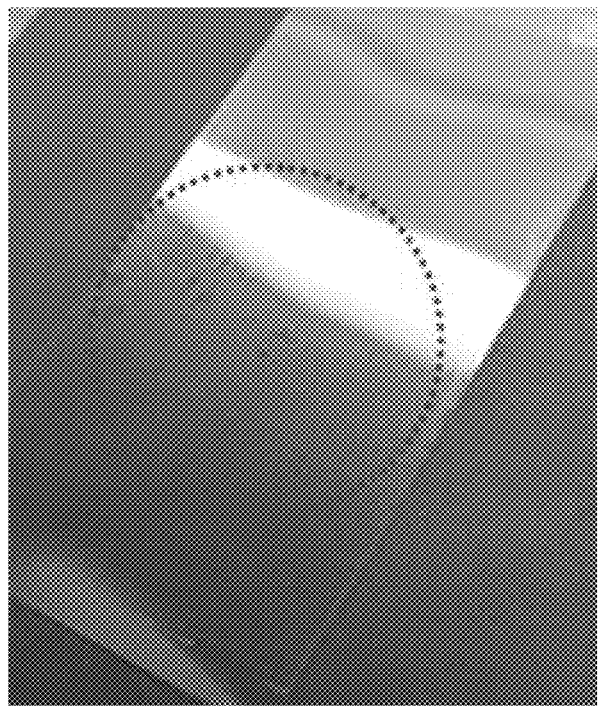
[Figure 6]
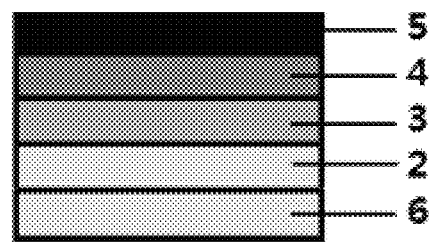

MULTILAYER LIQUID CRYSTAL FILM, POLARIZING PLATE AND METHOD FOR PREPARING POLARIZING PLATE

The present application is a National Phase entry pursuant to 35 U.S.C. § 371 of International Application No. PCT/KR2019/000838 filed on Jan. 21, 2019, and claims priority to and the benefit of Korean Patent Application No. 10-2018-0009403 filed in the Korean Intellectual Property Office on Jan. 25, 2018, the entire contents of which are incorporated herein by reference.

FIELD

The present application relates to a multi-layer liquid crystal film, a polarizing plate, and a method for manufacturing a polarizing plate.

BACKGROUND

A retardation film may have various uses. The retardation film may be disposed on one side or both sides of a liquid crystal cell, for example, in order to improve viewing angle characteristics of a display device. A retardation film is also used in order to prevent reflection, secure visibility, and the like in a reflective-type LCD or organic light emitting device (OLED), or the like.

A retardation film may be manufactured by a liquid crystal material. In order to use a liquid crystal material in a retardation film, the liquid crystal material may need to be appropriately aligned such that a desired retardation is exhibited. For example, in order to manufacture a multi-layer liquid crystal film in which two or more aligned liquid crystal films are laminated, generally, there is a method of laminating the respectively aligned liquid crystal films through an adhesive agent. However, this method has problems in that the process thereof is complicated, time-consuming, and expensive, and the final device has a large thickness.

Patent Document 1 relating to a method for manufacturing a multi-layer liquid crystal film without using an adhesive agent discloses coating a rubbing-treated substrate with a vertical alignment liquid crystal material by coating the rubbing-treated substrate with a horizontal alignment liquid crystal, and then adjusting the curing degree of the horizontal alignment liquid crystal film. However, the manufacturing method of Patent Document 1 has a problem in that when the alignment of the vertical alignment liquid crystal is improved, the bonding strength between liquid crystal films is reduced and the liquid crystal coatability deteriorates, and a problem in that when the liquid crystal coatability is improved, the alignability of the vertical alignment liquid crystal deteriorates.

(Patent Document 1) Korean Patent Application Laid-Open No. 2004-0002793

The present application provides a thinned multi-layer liquid crystal film, a method for manufacturing a polarizing plate by which it is possible to obtain a polarizing plate which has a low haze value and is thinned, and a polarizing plate manufactured by using the aforementioned process.

SUMMARY

An exemplary embodiment of the present invention provides a multi-layer liquid crystal film comprising: a substrate; a first alignment film provided on the substrate; a first liquid crystal film provided on the first alignment film; a second alignment film provided on the first liquid crystal film and comprising a multifunctional acrylate; and a second liquid crystal film provided on the second alignment film.

Another exemplary embodiment of the present invention provides a polarizing plate comprising: a polarizer; and the above-described multi-layer liquid crystal film provided on at least one surface of the polarizer, in which the second liquid crystal film is disposed adjacent to the polarizer.

Still another exemplary embodiment of the present invention provides a polarizing plate comprising: a polarizer; a first alignment film provided on at least one surface of the polarizer; a first liquid crystal film provided on the first alignment film; a second alignment film provided on the first liquid crystal film and comprising a multifunctional acrylate; and a second liquid crystal film provided on the second alignment film.

Finally, an exemplary embodiment of the present invention provides a method for manufacturing a polarizing plate, the method comprising: forming a first alignment film on a substrate; forming a first liquid crystal film on the first alignment film; forming a second alignment film on the first liquid crystal film by coating the first liquid crystal film with a second alignment film composition comprising a multifunctional acrylate; and forming a second liquid crystal film on the second alignment film.

A multi-layer liquid crystal film of the present invention may not only achieve thinning of the liquid crystal film, but may also improve the coatability of the liquid crystal without forming an adhesive agent between the liquid crystal film and an alignment film.

Further, the present invention may achieve thinning of a polarizing plate by laminating a multi-layer liquid crystal film to a polarizer, and then peeling off a substrate, and may obtain a polarizing plate having a low haze value after peeling off the substrate by adjusting flatness of the substrate to 10 nm or less.

BRIEF DESCRIPTION OF THE DRAWINGS

FIG. 1 is a schematic illustration of a stacking structure of a multi-layer liquid crystal film according to an exemplary embodiment of the present invention.

FIG. 2 is schematic illustration of a process of manufacturing a polarizing plate according to one embodiment of the present invention.

FIG. 3 is a schematic illustration of a process of manufacturing a polarizing plate according to a further embodiment of the present invention.

FIG. 4 is a view illustrating a surface of a polarizing plate manufactured in Example 2.

FIG. 5 is a view illustrating a surface of a polarizing plate manufactured in Comparative Example 3.

FIG. 6 is a schematic illustration of a stacking structure of a multi-layer liquid crystal film according to a further embodiment of the present invention.

INDEX OF REFERENCE NUMERALS

1: Substrate
2: First alignment film
3: First liquid crystal film
4: Second alignment film
5: Second liquid crystal film
6: Polarizer

DETAILED DESCRIPTION

Hereinafter, exemplary embodiments of the present invention will be described in more detail.

A multi-layer liquid crystal film according to an exemplary embodiment of the present application comprises: a substrate; a first alignment film provided on the substrate; a first liquid crystal film provided on the first alignment film; a second alignment film provided on the first liquid crystal film and comprising a multifunctional acrylate; and a second liquid crystal film provided on the second alignment film.

The multi-layer liquid crystal film may have a thickness of 0.1 μm to 5 μm, excluding any substrate.

The first alignment film may be a vertical alignment film, the first liquid crystal film may be a vertical alignment liquid crystal film, the second alignment film may be a horizontal alignment film, and the second liquid crystal film may be a horizontal alignment liquid crystal film.

Further, the first alignment film may be a horizontal alignment film, the first liquid crystal film may be a horizontal alignment liquid crystal film, the second alignment film may be a vertical alignment film, and the second liquid crystal film may be a vertical alignment liquid crystal film.

The horizontal alignment liquid crystal film may comprise a horizontal alignment liquid crystal material. The vertical alignment liquid crystal film may comprise a vertical alignment liquid crystal material.

In the present specification, a liquid crystal material may mean a material exhibiting liquid crystallinity. The liquid crystal material may comprise a site capable of exhibiting liquid crystallinity, for example, a mesogen skeleton.

In the present specification, the horizontal alignment liquid crystal material may mean a liquid crystal material capable of being horizontally aligned, and the vertical alignment liquid crystal material may mean a liquid crystal material capable of being vertically aligned.

In the present specification, the horizontal alignment may mean an alignment state in which a director of a liquid crystal material is arranged in a state of having a tilt angle of about 0 to 5 degrees with respect to the plane of a liquid crystal film.

In the present specification, the vertical alignment may mean an alignment state in which a director of a liquid crystal material is arranged in a state of having a tilt angle of about 90 to 85 degrees with respect to the plane of a liquid crystal film.

In the present specification, the director may mean an optical axis of a liquid crystal material. In the present specification, the optical axis may mean a slow axis of a liquid crystal material. As an example, when the liquid crystal material is in the form of a rod, the optical axis may mean a major axis of the liquid crystal material, and as another example, when the liquid crystal material is in the form of disc (discotic), the optical axis may mean an axis in the normal line direction of the disc.

In the present specification, the horizontal alignment may comprise a planar alignment, a twist alignment, or a cholesteric alignment.

In the present specification, the planar alignment may mean an alignment state in which a liquid crystal material in a liquid crystal film is horizontally aligned, and directors of the liquid crystal material form a layer in a state of being parallel to each other. The planar alignment may be referred to as having a uniform horizontal alignment.

In the present specification, the twist alignment or cholesteric alignment may mean a spirally aligned state in which the liquid crystal material in the liquid crystal film is aligned horizontally and the directors of the liquid crystal materials form a layer while being twisted along the helical axis, and are aligned.

When a distance for a director of the liquid crystal material to complete a 360 degree rotation is referred to as a "pitch," the liquid crystal film in the twist orientation may have a thickness of less than the pitch. That is, in the liquid crystal film having the twist alignment, the director of the liquid crystal material may not be rotated 360 degrees. In a liquid crystal film having the cholesteric alignment, the director of the liquid crystal material may be rotated 360 degrees. The cholesteric alignment has a spiral structure in which the directors of the liquid crystal compound form a layer while being twisted along the helical axis and are aligned, and the liquid crystal compound may be rotated 360 degrees at the pitch.

The horizontal alignment liquid crystal material and/or the vertical alignment liquid crystal material may be a polymerizable liquid crystal material. That is, the horizontal alignment liquid crystal material and/or the vertical alignment liquid crystal material may comprise a mesogen skeleton and one or more polymerizable functional groups. The polymerizable liquid crystal material may comprise, for example, one, two, three, or four or more of the functional groups. The polymerizable functional group may be an alkenyl group, an epoxy group, an acryloyl group, a methacryloyl group, an acryloyloxy group, or a methacryloyloxy group.

The horizontal alignment liquid crystal film may comprise the horizontal alignment liquid crystal material in a polymerized state. The vertical alignment liquid crystal film may comprise the vertical alignment liquid crystal material in a polymerized state. In the present specification, "the liquid crystal material is included in a polymerized state" may mean a state in which the liquid crystal material is polymerized to form a skeleton such as a main chain or a side chain of the liquid crystal polymer in the liquid crystal film.

As the horizontal alignment liquid crystal material or the vertical alignment liquid crystal material, polymerizable liquid crystal materials usually used in the art can be used without limitation.

In one example, the polymerizable liquid crystal material may be a compound represented by the following Formula 1.

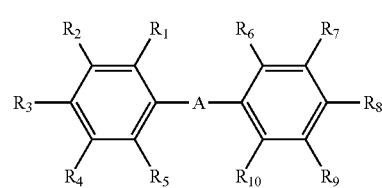

[Formula 1]

In Formula 1, A is a single bond, —COO—, or —OCO—, $R_1$ to $R_{10}$ are the same as or different from each other, and are each independently hydrogen, halogen, an alkyl group, a cycloalkyl group, an alkoxy group, an alkoxycarbonyl group, a cyano group, a nitro group, —U-Q-P, or a substituent of the following Formula 2, or two adjacent substituents of $R_1$ to $R_5$ or two adjacent substituents of $R_6$ to $R_{10}$ are linked to each other to form a benzene substituted with —U-Q-P, provided that at least one of $R_1$ to $R_{10}$ is —U-Q-P or a substituent of the following Formula 2, or at least one pair of two adjacent substituents of $R_1$ to $R_5$ or two adjacent substituents of $R_6$ to $R_{10}$ are linked to each other to form a benzene substituted with —U-Q-P, in which U is —O—, —COO—, or —OCO—, Q is an alkylene group or an alkylidene group, and P is an alkenyl group, an epoxy group, an acryloyl group, a methacryloyl group, an acryloyloxy group, or a methacryloyloxy group.

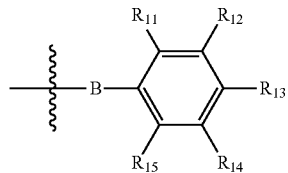

[Formula 2]

In Formula 2, B is a single bond, —COO—, or —OCO—, $R_{11}$ to $R_{15}$ are the same as or different from each other, and are each independently hydrogen, halogen, an alkyl group, a cycloalkyl group, an alkoxy group, a cyano group, a nitro group, or —U-Q-P, provided that at least one of $R_{11}$ to $R_{15}$ is —U-Q-P, where U is —O—, —COO—, or —OCO—, Q is an alkylene group or an alkylidene group, P is an alkenyl group, an epoxy group, an acryloyl group, a methacryloyl group, an acryloyloxy group, or a methacryloyloxy group.

In Formula 2,

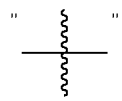

may mean that the moiety is linked to a mother compound. For example, in Formula 2,

on the left side of B may mean that B is directly linked to a benzene of Formula 1.

The single bond may mean that no separate atom or atomic group is present at the corresponding site. For example, in Formulae 1 and 2, the single bond means a case where no separate atom is present at the moiety represented by A or B. More specifically, in Formula 1, when A is a single bond, benzenes on both sides of A may be directly linked to form a biphenyl structure.

The alkylene group or alkylidene group may have 1 to 20 carbon atoms, and according to an example, the alkylene group or alkylidene group may have 1 to 16 carbon atoms, and according to another example, an alkylene group or alkylidene group having 1 to 12 carbon atoms, 1 to 8 carbon atoms, 1 to 4 carbon atoms, 4 to 10 carbon atoms, or 6 to 9 carbon atoms may be exemplified. The alkylene group or alkylidene group may be straight-chained, branch-chained, or cyclic.

The alkylene group or alkylidene group may be optionally substituted with one or more substituents.

The alkenyl group may have 2 to 20 carbon atoms, and according to an example, the alkenyl group may have 2 to 16 carbon atoms, and according to another example, an alkenyl group having 2 to 12 carbon atoms, 2 to 8 carbon atoms, 2 to 4 carbon atoms, 4 to 10 carbon atoms, or 6 to 9 carbon atoms may be exemplified. The alkenyl group may be straight-chained, branch-chained, or cyclic.

As an example of the alkenyl group, a vinyl group, an allyl group, a propenyl group, an isopropenyl group, a butenyl group, a hexenyl group, a cyclohexenyl group or an octenyl group, and the like may be exemplified, and the alkenyl group may be substituted with an additional substituent.

In the present specification, the substituent which may be substituted by any compound or substituent may be exemplified by halogen, a hydroxyl group, an alkyl group, an alkoxy group, an alkenyl group, an epoxy group, a cyano group, a carboxyl group, an isocyanate group, a mercapto group, an acryloyl group, a methacryloyl group, an acryloyloxy group, a methacryloyloxy group or an aryl group, and the like, but is not limited thereto.

The aryl group may mean a monovalent residue derived from a compound having a benzene ring or comprising a structure in which two or more benzene rings are condensed, or a derivative thereof. Furthermore, the aryl group may be a concept comprising an aralkyl group and the like. The aryl group may have 6 to 22 carbon atoms, and may have 6 to 16 carbon atoms according to an example.

As an example of the aryl group, a phenyl group, a phenylethyl group, a phenylpropyl group, a benzyl group, a tolyl group, a xylyl group, or a naphthyl group, and the like may be exemplified, and the aryl group may be substituted with an additional substituent.

According to an exemplary embodiment of the present invention, P's in Formulae 1 and 2 may be each independently an acryloyl group, a methacryloyl group, an acryloyloxy group, or a methacryloyloxy group. Further, in another example, P's in Formulae 1 and 2 may be each independently an acryloyloxy group or a methacryloyloxy group.

In Formulae 1 and 2, a substituent which is not substituted with —U-Q-P or Formula 2, in which at least one may be present may be bonded to one or more positions of $R_3$, $R_8$, and $R_{13}$.

According to an exemplary embodiment of the present invention, in Formulae 1 and 2, a substituent which is not substituted with —U-Q-P or Formula 2 may be hydrogen, halogen, a straight-chained or branched alkyl group having 1 to 4 carbon atoms, a cycloalkyl group having 4 to 12 carbon atoms, a cyano group, an alkoxy group having 1 to 4 carbon atoms, or a nitro group.

In another exemplary embodiment, in Formulae 1 and 2, a substituent which is not substituted with —U-Q-P or Formula 2 may be chlorine, a straight-chained or branched alkyl group having 1 to 4 carbon atoms, a cycloalkyl group having 4 to 12 carbon atoms, an alkoxy group having 1 to 4 carbon atoms, or a cyano group.

In one example, as the horizontal alignment material, a compound in which polarities at both ends are slightly different or the same may be used. According to an example, as the horizontal alignment liquid crystal compound, a compound having functional groups with the polarities slightly different or the same at any one of $R_7$ to $R_9$ and any one of $R_2$ to $R_4$ in Formula 1 may be used. Specifically, the horizontal alignment liquid crystal compound may be a compound in which any one of $R_7$ to $R_9$ and any one of $R_2$ to $R_4$ is —U-Q-P or Formula 2, or two adjacent substituents of $R_7$ to $R_9$ and two adjacent substituents of $R_2$ to $R_4$ are linked to each other to form a benzene substituted with —U-Q-P.

U may be —O—, —COO—, or —OCO—, Q may be an alkylene group or an alkylidene group, and P may be an acryloyl group, a methacryloyl group, an acryloyloxy group, or a methacryloyloxy group.

Further, when any one of $R_7$ to $R_9$ and any one of $R_2$ to $R_4$ in Formula 1 are selected as described above as the horizontal alignment liquid crystal material, the other substituents may be hydrogen or an alkyl group having 1 to 6 carbon atoms. However, the horizontal alignment liquid crystal material is not limited thereto and may be appropriately selected depending on the use of the present invention.

In addition, as the vertical alignment liquid crystal material, a compound having a different polarity at both ends may be used. According to an example, the vertical alignment liquid crystal material may be a compound in which any one of $R_7$ to $R_9$ in Formula 1 is —U-Q-P or Formula 2, or two adjacent substituents of $R_7$ to $R_9$ are linked to each other to form a benzene substituted with —U-Q-P.

U may be —O—, —COO—, or —OCO—, Q may be an alkylene group or an alkylidene group, and P may be an acryloyl group, a methacryloyl group, an acryloyloxy group, or a methacryloyloxy group.

Furthermore, when any one of $R_7$ to $R_9$ in Formula 1 is selected as described above as the vertical alignment liquid crystal material, the other substituents may be hydrogen or an alkyl group. However, the vertical alignment liquid crystal material is not limited thereto, and any liquid crystal compound having a different polarity at both ends may be selected without limitation.

The horizontal alignment liquid crystal film may have a normal wavelength dispersion characteristic, a flat wavelength dispersion characteristic, or a reverse wavelength dispersion characteristic. In the present specification, the normal wavelength dispersion characteristic may mean a characteristic that satisfies the following Equation 1, the flat wavelength dispersion characteristic may mean a characteristic that satisfies the following Equation 2, and the reverse wavelength dispersion characteristic may mean a characteristic that satisfies the following Equation 3. According to an example of the present invention, wavelength dispersibility of the horizontal alignment liquid crystal film may have a value of R (450)/R (550) of 0.8 to 1.2.

$$R(450)/R(550) > 1 \quad \text{[Equation 1]}$$

$$R(450)/R(550) \approx 1 \quad \text{[Equation 2]}$$

$$R(450)/R(550) < 1 \quad \text{[Equation 3]}$$

In Equations 1 to 3, R ($\lambda$) may mean an in-plane retardation of the liquid crystal film with respect to the light having a wavelength of $\lambda$ nm. The in-plane retardation is a numerical value calculated as (Nx−Ny)×d. Here, Nx is a refractive index in the x-axis direction of the liquid crystal film, Ny is a refractive index in the y-axis direction of the liquid crystal film, and d is a thickness of the liquid crystal film. Here, the x-axis means any one direction on the plane of the liquid crystal film, and the y-axis means a direction on the plane perpendicular to the x-axis. In one example, the x-axis may be in a direction parallel to the slow axis of the liquid crystal film, and the y-axis may be in a direction parallel to the fast axis of the liquid crystal film. According to an example, the slow axis may be parallel to the director of the liquid crystal material.

The horizontal alignment liquid crystal film may be manufactured by applying the horizontal alignment liquid crystal material on a substrate in which a horizontal alignment film is formed and polymerizing the horizontal alignment liquid crystal material.

In the present specification, when describing the application or coating of B on A, this may mean that an appropriate surface treatment is performed on A and B is applied or coated, unless otherwise specified. As the surface treatment, for example, a corona treatment, a plasma treatment, and the like may be exemplified. The surface treatment may improve adhesion strength between the configuration A and the configuration B.

As the substrate, an inorganic film such as a glass film, a crystalline or non-crystalline silicon film, a quartz film or an indium tin oxide (ITO) film, or a plastic film, and the like may be used. As the substrate, an optically isotropic substrate, or an optically anisotropic substrate such as a retardation layer, and the like may be used.

As the plastic film, it is possible to use a substrate layer comprising triacetyl cellulose (TAC); a cyclo olefin copolymer (COP) such as a norbornene derivative; poly(methyl methacrylate) (PMMA); polycarbonate (PC); polyethylene (PE); polypropylene (PP); polyvinyl alcohol (PVA); diacetyl cellulose (DAC); polyacrylate (PAC); polyethersulfone (PES); polyether ether ketone (PEEK); polyphenylsulfone (PPS); polyetherimide (PEI); polyethylene naphthalate (PEN); polyethylene terephthalate (PET); polyimide (PI); polysulfone (PSF); polyarylate (PAR), or an amorphous fluororesin, and the like, but the plastic film is not limited thereto.

According to an exemplary embodiment of the present invention, the substrate may have a flatness (Ra, Roughness) of 10 nm or less. More specifically, the substrate may have a flatness of 1 nm to 5 nm. When the flatness of the substrate may not satisfy the above range, the haze of a polarizing plate manufactured by laminating the multi-layer liquid crystal film of the present invention to a polarizer and peeling off the substrate is increased, so that optical characteristics of the polarizing plate may deteriorate. The flatness may be measured by using an optical profiler (Nanoview E-1000 manufactured by Nanosystem Co., Ltd.).

The haze value of the polarizing plate may be 0.1% to 1.0%, and may be 0.1% to 0.5% according to an example. When the haze value is out of the above range, optical characteristics deteriorate because the transmittance of the degree of polarization is reduced, and when the haze value satisfies the above range, there is an advantage in that optical characteristics do not deteriorate because the transmittance of the degree of polarization is not reduced.

The substrate may have a thickness of 40 μm to 100 μm.

The first alignment film provided on the substrate may be a vertical alignment film or a horizontal alignment film, and the vertical or horizontal alignment film may be an optical alignment film. The optical alignment film may be formed of a first alignment composition comprising an optical alignment film material. In the present specification, the optically alignment film material may mean a material which exhibits liquid crystal alignability by irradiation with light, specifically, irradiation with polarized ultraviolet rays, and more specifically, irradiation with linearly polarized ultraviolet rays. The optical alignment film may be formed by applying the optical alignment film material on the substrate and irradiating the optical alignment film material with polarized ultraviolet rays, specifically, linearly polarized ultraviolet rays. The optical alignment film material may comprise at least one of polycinnamate, polyamide, polyimide, polyvinyl alcohol, and polyamic acid, but is not limited thereto. More specifically, the optical alignment film material may be 4-benzyloxy-cinnamate-propyl-acrylate.

The first alignment composition may further comprise a solvent.

The polymerization of the first alignment composition may be performed by irradiating the first alignment composition with ultraviolet rays. The irradiation with ultraviolet rays may be performed at a temperature of room temperature or 40° C. or less, and may be performed by irradiating the first alignment composition with ultraviolet rays at a light quantity of 200 mJ to 1,500 mJ for 1 second to 10 seconds.

The first alignment film may have a thickness of 0.1 μm to 3 μm.

The first liquid crystal film provided on the first alignment film may be a vertical or horizontal alignment liquid crystal film, and may be formed by applying a first liquid crystal composition comprising a vertical or horizontal alignment liquid crystal material on a first alignment film and irradiating the vertical or horizontal alignment liquid crystal material with ultraviolet rays. The application of the first liquid crystal composition on the first alignment film may be performed by a typical coating method. The coating method may be exemplified by roll coating, bar coating, comma coating, ink jet coating or spin coating, and the like, and is not limited thereto.

The first liquid crystal composition may further comprise a solvent.

The polymerization of the liquid crystal material included in the first liquid crystal composition may be performed by irradiating the first liquid crystal composition with ultraviolet rays. The irradiation with ultraviolet rays may be performed at a temperature of room temperature or 40° C. or less, and may be performed by irradiating the first liquid crystal composition with ultraviolet rays at a light quantity of 200 mJ to 1,000 mJ for 1 second to 10 seconds.

The second alignment film provided on the first liquid crystal film may be a horizontal or vertical alignment film, and comprises a multifunctional acrylate. The multifunctional acrylate may mean a material having two or more acrylate groups. As the multifunctional acrylate, pentaerythritol triacrylate (PETA), dimethylol tricycle decane dimethacrylate (DCP-A), trimethylolpropane triacrylate (TMPTA), dipentaerythritol penta-/hexa-acrylate (DPHA), and the like may be used.

When the second alignment film comprises a multifunctional acrylate, a polarizing plate having a low haze value may be manufactured, and there is an advantage in that no unevenness occurs on the surface of the multi-layer liquid crystal film.

The second alignment film may be manufactured by applying a second alignment composition comprising a multifunctional acrylate on the first liquid crystal film and polymerizing the composition.

The second alignment composition may further comprise a photoinitiator.

The second alignment composition may further comprise a solvent.

Further, the second alignment composition may comprise 2 wt % to 15 wt % of a multifunctional acrylate, 0.2 wt % to 2 wt % of a photoinitiator, and 83 wt % to 97.5 wt % of a solvent. When the content of the multifunctional acrylate in the second alignment film composition is less than 2 wt %, the film strength is reduced so that scratches may occur during the additional coating, and when the content is more than 15 wt %, the alignability of the liquid crystal may deteriorate.

As the photoinitiator, a photoinitiator widely-known in the art of the present invention may be used without limitation, and examples thereof comprise α-amino ketones, acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, coumarins, and the like.

The application of the second alignment composition on the first liquid crystal film may be performed by a typical coating method. The coating method may be exemplified by roll coating, bar coating, comma coating, ink jet coating or spin coating, and the like, and is not limited thereto.

The polymerization of the second alignment composition may be performed by irradiating the second alignment composition with ultraviolet rays. The irradiation with ultraviolet rays may be performed at a temperature of room temperature or 40° C. or less, and may be performed by irradiating the second alignment composition with ultraviolet rays at a light quantity of 200 mJ to 1,500 mJ for 1 second to 10 seconds.

The second alignment film may have a thickness of 0.1 μm to 5 μm.

The second liquid crystal film may be formed by applying a second liquid crystal composition comprising a vertical or horizontal alignment liquid crystal material on the second alignment film and irradiating the second liquid crystal composition with ultraviolet rays to polymerize the second liquid crystal composition. The application of the second liquid crystal composition on the second alignment film may be performed by a typical coating method. The coating method may be exemplified by roll coating, bar coating, comma coating, ink jet coating or spin coating, and the like, and is not limited thereto.

The second liquid crystal composition may further comprise a solvent.

The polymerization of the liquid crystal material included in the second liquid crystal composition may be performed by irradiating the second liquid crystal composition with ultraviolet rays. The irradiation with ultraviolet rays may be performed at a temperature of room temperature or 50° C. or less, and may be performed by irradiating the second liquid crystal composition with ultraviolet rays at a light quantity of 300 mJ to 1,500 mJ for 1 second to 10 seconds.

The solvent used in the present invention may be toluene, xylene, butyl cellosolve, diethylene glycol dimethyl ether, and the like, but is not limited thereto.

The thickness of the first liquid crystal film or second liquid crystal film may be appropriately adjusted according to the use of the multi-layer liquid crystal film. According to an example, the first liquid crystal film and the second liquid crystal film may have a thickness of 1 μm to 10 μm, respectively, and according to another example, the first liquid crystal film and the second liquid crystal film may have a thickness of 1 μm to 5 μm, respectively, but the thickness is not limited thereto.

The multi-layer liquid crystal film of the present invention may not include an adhesive agent between the first liquid crystal film and the second alignment film, or between the second liquid crystal film and the second alignment film. The multi-layer liquid crystal film has an advantage in that the thickness may be thinned as compared to a multi-layer liquid crystal film stacked through an adhesive agent.

According to an exemplary embodiment of the present invention, as illustrated in FIG. 1, the multi-layer liquid crystal film may be stacked in the order of a substrate 1, a first alignment film 2, a first liquid crystal film 3, a second alignment film 4, and a second liquid crystal film 5, and a structure of the multi-layer liquid crystal film according to this example of the present invention is also illustrated in FIG. 1. The polarizing plate according to an exemplary embodiment of the present invention comprises: a polarizer; and the above-described multi-layer liquid crystal film provided on at least one surface of the polarizer, in which the second liquid crystal film is disposed adjacent to the polarizer.

As illustrated in FIG. 6, the polarizing plate according to another exemplary embodiment comprises: a polarizer 6; a first alignment film 2 provided on at least one surface of the polarizer; a first liquid crystal film 3 provided on the first alignment film; a second alignment film 4 provided on the first liquid crystal film and comprising a multifunctional acrylate; and a second liquid crystal film 5 provided on the second alignment film, and the content described on the multi-layer liquid crystal film may be applied equally to the first alignment film, the first liquid crystal film, the second alignment film, and the second liquid crystal film, unless otherwise specified. The polarizing plate as described above may be manufactured by peeling off a substrate from the above-described polarizer; and a polarizing plate in which a second liquid crystal film of the above-described multi-layer liquid crystal film is disposed adjacent to the polarizer on at least one surface of the polarizer.

As illustrated in FIGS. 1 and 2, an exemplary embodiment of the present invention provides a method for manufacturing a polarizing plate, the method comprising: forming a first alignment film 2 on a substrate 1; forming a first liquid crystal film 3 on the first alignment film 2; forming a second alignment film 4 on the first liquid crystal film 3 by coating the first liquid crystal film 3 with a second alignment film composition comprising a multifunctional acrylate; and forming a second liquid crystal film 5 on the second alignment film 4.

AS illustrated in FIG. 3, another exemplary embodiment of the present invention provides a method for manufacturing a polarizing plate, the method comprising: forming a first alignment film 2 on the substrate 1; forming a first liquid crystal film 3 on the first alignment film 2; forming a second alignment film 4 on the first liquid crystal film 3 by coating the first liquid crystal film 3 with a second alignment film composition comprising a multifunctional acrylate; forming a second liquid crystal film 5 on the second alignment film; laminating the second liquid crystal film 5 to a polarizer 6; and peeling off the substrate 1. The content described on the multi-layer liquid crystal film may be applied equally to the substrate 1, the first alignment film 2, the first liquid crystal film 3, the second alignment film 4, and the second liquid crystal film 5, unless otherwise specified.

In the method for manufacturing a polarizing plate, thinning of the polarizing plate may be achieved by peeling off of the substrate 1.

As noted above, methods for manufacturing a polarizing plate according to the present invention are illustrated in FIGS. 2 and 3, FIG. 2 illustrates forming a first alignment film 2 on a substrate 1; forming a first liquid crystal film 3 on the first alignment film 2; forming a second alignment film 4 on the first liquid crystal film 3 by coating the first liquid crystal film 3 with a second alignment film composition comprising a multifunctional acrylate; and forming a second liquid crystal film 5 on the second alignment film. FIG. 3 illustrates laminating the second liquid crystal film 5 to a polarizer 6; and peeling off the substrate 1.

In the method for manufacturing a polarizing plate of the present invention, an adhesive agent may not be included between the first liquid crystal film and the second alignment film, or between the second liquid crystal film and the second alignment film. The thus-manufactured multi-layer liquid crystal film has an advantage in that the thickness may be reduced as compared to a multi-layer liquid crystal film stacked through an adhesive agent.

As the polarizer, those known in the art may be used. For example, it is possible to use a polarizer in which iodine or a dichroic dye is adsorbed and aligned to a polyvinyl alcohol-based (hereinafter, referred to as PVA) polymer film.

The polarizer and the second liquid crystal film may be laminated to each other by using a bonding or adhesive agent. As the bonding or adhesive agent, those known in the art may be used. For example, a pressure-sensitive adhesive (PSA) or a UV adhesive (UVA) may be used.

When a multi-layer liquid crystal film, in which a first alignment film; a first liquid crystal film provided on the first alignment film; a second alignment film provided on the first liquid crystal film and comprising a multifunctional acrylate; and a second liquid crystal film provided on the second alignment film are stacked in this order on one surface of the polarizer, is formed, an additional film may be provided on the other surface of the polarizer.

As the additional film, those known in the art may be used, and it is possible to use, for example, a triacetate cellulose (TAC) film, a polynorbornene-based film manufactured by an acrylic film ring opening metathesis polymerization (ROMP), a ring opening metathesis polymerization followed by hydrogenation (ROMP) polymer film obtained by subjecting a ring opening polymerized cyclic olefin-based polymer to hydrogenation again, a polyester film, a polynorbornene-based film manufactured by addition polymerization, and the like. Besides, a film manufactured of a transparent polymer material may be used as a protective film, and the like, but is not limited thereto.

An exemplary embodiment of the present invention provides a liquid crystal display device comprising the above-described polarizing plate. In the liquid crystal display device, the polarizer or multi-layer liquid crystal film of the above-described polarizing plate may be disposed close to the liquid crystal panel. The substrate of the multi-layer liquid crystal film may be peeled off before or after the above-described polarizer is attached to the liquid crystal panel. The polarizing plate may be attached to the liquid crystal panel through a pressure-sensitive adhesive (PSA), and as the pressure-sensitive adhesive, those known in the art may be used.

The liquid crystal display device may comprise a backlight unit. The backlight unit may comprise a light source, a light guide plate, and an optical film such as a light-collecting film or a brightness enhancement film, and may have a configuration known in the art. Furthermore, in the liquid crystal display device, the above-described polarizing plate may be used for an upper polarizing plate or a lower polarizing plate.

EXAMPLES

Hereinafter, exemplary embodiments of the present application will be exemplified through Examples. The following Examples are provided for exemplifying the invention of the present application, and are not intended to limit the present invention by the Examples.

Experimental Example 1

Example 1

After corona treatment on the surface of a polyethylene terephthalate (PET) substrate (Ra, 1.5 nm), a optically alignment film material (4-benzyloxy-cinnamate-propyl-acrylate) was applied thereon, and irradiated with polarized ultraviolet rays to form an optically alignment film. After corona treatment on the surface of the optical alignment film, a vertical alignment liquid crystal composition (a vertical alignment liquid crystal material (RMM460, Merck) was diluted with toluene and diethylene glycol dimethyl ether solvents to a concentration of 23%) was applied thereon, and irradiated with ultraviolet rays at a light quantity of 1,000 mJ to form a vertical alignment liquid crystal film having a thickness of 1.5 μm. After corona treatment on the surface of the vertical alignment liquid crystal film, a horizontal alignment film composition (comprising 5 wt % of a multifunctional acrylate pentaerythritol triacrylate (PETA), 0.5 wt % of a photoinitiator (Irg184, Ciba), and the balance solvent) was applied thereon and irradiated with ultraviolet rays at a light quantity of 700 mJ to polymerize the horizontal alignment film composition, thereby forming a horizontal alignment film. After corona treatment on the surface of the horizontal alignment film, a horizontal alignment liquid crystal composition (a horizontal alignment liquid crystal material (RMM1290, Merck) was diluted with toluene and butyl cellosolve solvents to a concentration of 25 wt %) was applied thereon, and irradiated with ultraviolet rays at a light quantity of 700 mJ, and the horizontal alignment liquid crystal composition was polymerized to form a horizontal alignment liquid crystal film having a thickness of 1.5 μm, thereby forming a multi-layer liquid crystal film having a thickness of 1.5 μm. The multi-layer liquid crystal film had a total thickness of 43 μm.

Comparative Example 1

A multi-layer liquid crystal film was manufactured in the same manner as in Example 1, except that a horizontal alignment liquid crystal film was formed immediately on a vertical alignment liquid crystal film without forming a horizontal alignment film in Example 1.

Evaluation of Coatability

After the polarizing plates were orthogonal to each other, the coatability in a large area was compared between the polarizing plates, and the magnitude of dewetting was evaluated using a polarization microscope (NIKON, ECLIPSE LV100 POL). As a result of the coatability evaluation, it can be confirmed that the coatability is improved because the dewetting in Example 1 is decreased as compared to that in Comparative Example 1.

Experimental Example 2

Example 2

After the horizontal alignment liquid crystal film of the multi-layer liquid crystal film manufactured in Example 1 was laminated to a polarizer (PVA) by using a pressure-sensitive adhesive (PSA), a polarizing plate was manufactured by peeling off a substrate (Ra, 1.5 nm), and the surface of the manufactured polarizing plate is illustrated in FIG. 4.

Comparative Example 2

A polarizing plate was manufactured in the same manner as in Example 2, except that a PET substrate (Ra, 40 nm) was used instead of the PET substrate (Ra, 1.5 nm) in Example 2.

Comparative Example 3

A polarizing plate was manufactured in the same manner as in Example 2, except that as a material for the second alignment film, polyvinyl alcohol was used instead of the multifunctional acrylate in Example 2, and the surface of the manufactured polarizing plate is illustrated in FIG. 5. From FIGS. 4 and 5, it can be confirmed that when polyvinyl alcohol is used as the material for the second alignment film, unevenness occurs on the surface of the polarizing plate.

Measurement of Haze Values

The manufactured multi-layer liquid crystal film was measured by a haze meter (HM-150 manufactured by Murakami Color Research Laboratory Co., Ltd.).

Measurement of Ts (%), Tc (%), and DOP (%)

After the polarizing plates manufactured by the Examples and the Comparative Examples were cut into a size of 40 mm×40 mm and the test specimens were fixed to a measurement holder, initial optical properties, that is, a single body transmittance (Ts), a crossed transmittance (Tc), and a degree of polarization (DOP, %) were measured by using a UV-visible light spectrometer (V-7100, manufactured by JASCO Corp.). The single body transmittance (Ts) is a value measured for one polarizing plate, and the crossed transmittance (Tc) was measured after the two cut polarizing plates are orthogonal to each other such that the absorption axes thereof become 90 degrees, and the single body transmittance (Ts) and the crossed transmittance (Tc) are shown in Table 1. The degree of polarization (DOP, %) is defined as the following equation by the parallel transmittance (Tp) obtained when two polarizing plates are disposed in a state in which the absorption axes thereof are parallel to each other and the crossed transmittance (Tc) obtained after the two polarizing plates were orthogonal to each other so as to make the absorption axes form an angle of 90 degrees.

$$DOP=[(Tp-Tc)/(Tp+Tc)]\times\tfrac{1}{2}$$

The haze, Ts, Tc, and degree of polarization (DOP) of each of Example 2 and Comparative Examples 2 and 3 were measured, and the results thereof are shown in the following Table 1.

TABLE 1

|  | Haze (%) | Ts (%) | Tc (%) | DOP (%) |
| --- | --- | --- | --- | --- |
| Example 2 | 0.3 | 42.29 | 0.0019 | 99.9947 |
| Comparative Example 2 | 2.7 | 41.78 | 0.0029 | 99.9916 |
| Comparative Example 3 | 3.4 | 40.95 | 0.0043 | 99.9870 |

From Table 1, it can be confirmed that the haze value and optical properties of the polarizing plate in Example 2 of the present invention are low and excellent, respectively as compared to those in Comparative Examples 2 and 3.

The invention claimed is:

1. A multi-layer liquid crystal film comprising:
a substrate;
a first alignment film provided on the substrate, wherein the first alignment film comprises 4-benzyloxy-cinnamate-propyl-acrylate;
a first liquid crystal film provided on the first alignment film;
a second alignment film provided on the first liquid crystal film and comprising a multifunctional acrylate; and
a second liquid crystal film provided on the second alignment film
wherein the substrate has a flatness of 10 nm or less, and
wherein the first alignment film, first liquid crystal film, second alignment layer, and second liquid crystal film have a combined thickness of 0.1 μm to 5 μm.

2. The multi-layer liquid crystal film of claim 1, wherein the first alignment film is a vertical alignment film, the first liquid crystal film is a vertical alignment liquid crystal film, the second alignment film is a horizontal alignment film, and the second liquid crystal film is a horizontal alignment liquid crystal film.

3. The multi-layer liquid crystal film of claim 1, wherein the first alignment film is a horizontal alignment film, the first liquid crystal film is a horizontal alignment liquid crystal film, the second alignment film is a vertical alignment film, and the second liquid crystal film is a vertical alignment liquid crystal film.

4. A polarizing plate comprising:
a polarizer; and
the multi-layer liquid crystal film of claim 1 provided on at least one surface of the polarizer,
wherein the second liquid crystal film is disposed adjacent to the polarizer.

5. The multi-layer liquid crystal film of claim 1, wherein the substrate has a thickness of 40 μm to 100 μm.

6. The multi-layer liquid crystal film of claim 1, wherein the first alignment film has a thickness of 0.1 μm to 3 μm, and the second alignment film has a thickness of 0.1 μm to 5 μm.

7. The multi-layer liquid crystal film of claim 1, wherein the multifunctional acrylate comprises pentaerythritol triacrylate (PETA), dimethylol tricycle decane dimethacrylate (DCP-A), trimethylolpropane triacrylate (TMPTA), or dipentaerythritol penta-hexa-acrylate (DPHA).

8. The multi-layer liquid crystal film of claim 1, wherein the multi-layer liquid crystal film does not include an adhesive between the first liquid crystal film and the second alignment film, or between the second liquid crystal film and the second alignment film.

9. A method for manufacturing a polarizing plate, the method comprising:
forming a first alignment film on a substrate, wherein the first alignment film comprises 4-benzyloxy-cinnamate-propyl-acrylate;
forming a first liquid crystal film on the first alignment film;
forming a second alignment film on the first liquid crystal film by coating the first liquid crystal film with a second alignment film composition comprising a multifunctional acrylate; and
forming a second liquid crystal film on the second alignment film,
wherein the substrate has a flatness of 10 nm or less.

10. The method of claim 9, further comprising:
laminating the second liquid crystal film to a polarizer after the forming of the second liquid crystal film on the second alignment film; and
peeling off the substrate.

11. The method of claim 9, wherein the substrate has a flatness of 10 nm or less.

12. The method of claim 9, wherein the second alignment film composition further comprises a photoinitiator.

13. The method of claim 9, wherein the second alignment film composition comprises 2 wt % to 15 wt % of the multifunctional acrylate, 0.2 wt % to 2 wt % of the photoinitiator, and 83 wt % to 97.5 wt % of the solvent.

14. The method of claim 9, wherein the first alignment film is a vertical alignment film, the first liquid crystal film is a vertical alignment liquid crystal film, the second alignment film is a horizontal alignment film, and the second liquid crystal film is a horizontal alignment liquid crystal film.

15. The method of claim 9, wherein the first oriented film is a horizontally oriented film, the first liquid crystal film is a horizontal alignment liquid crystal film, the second alignment film is a vertical alignment film, and the second liquid crystal film is a vertical alignment liquid crystal film.

16. The method of claim 9, wherein an adhesive agent is not formed between the first liquid crystal film and the second alignment film, or between the second liquid crystal film and the second alignment film.

* * * * *